Figure 1:
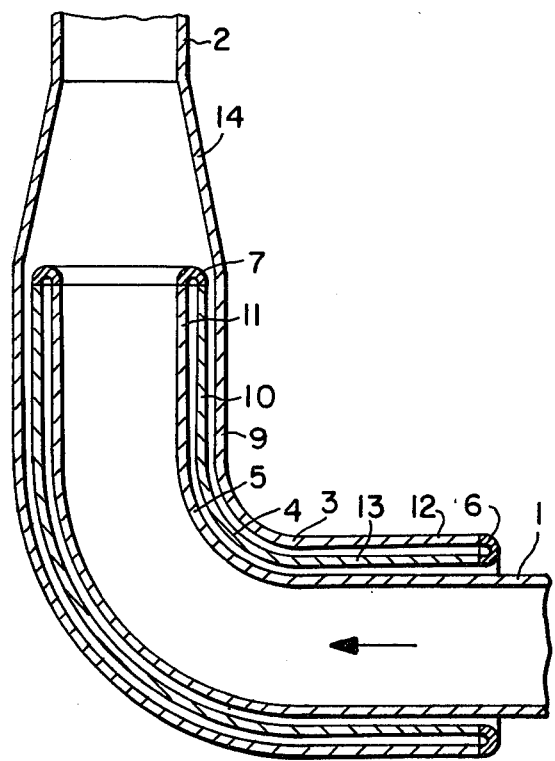

United States Patent [19]

Jansing

[11] 4,315,644
[45] Feb. 16, 1982

[54] MULTISHELL PIPE BEND

[75] Inventor: Walter Jansing, Bergisch Gladbach, Fed. Rep. of Germany

[73] Assignee: Interatom Internationale Atomreaktorbau GmbH, Bergisch Gladbach, Fed. Rep. of Germany

[21] Appl. No.: 175,209
[22] PCT Filed: Feb. 12, 1979
[86] PCT No.: PCT/DE79/00015
  § 371 Date: Oct. 23, 1979
  § 102(e) Date: Oct. 18, 1979
[87] PCT Pub. No.: WO79/00650
  PCT Pub. Date: Sep. 6, 1979

[30] Foreign Application Priority Data

Feb. 23, 1978 [DE] Fed. Rep. of Germany ....... 2807773
Nov. 6, 1978 [DE] Fed. Rep. of Germany ....... 2848111

[51] Int. Cl.³ .............................................. F16L 51/04
[52] U.S. Cl. .................................... 285/179; 285/187; 138/148
[58] Field of Search ............... 285/179, 223, 224, 157, 285/187, 425; 138/148, 143, 142

[56] References Cited
U.S. PATENT DOCUMENTS

| 858,100 | 6/1907 | Pedersen | 285/187 |
| 1,900,561 | 3/1933 | Junggren | 285/224 |
| 3,275,345 | 9/1966 | Waldron et al. | 285/187 X |
| 3,818,935 | 6/1974 | Karker et al. | 285/179 X |

FOREIGN PATENT DOCUMENTS 2173276 10/1973 France .
635076 2/1962 Italy .................................. 285/187

OTHER PUBLICATIONS

Journal of the British Nuclear Energy Society, vol. 14, No. 1, Jan. 1975, pp. 35–38.

Primary Examiner—Thomas F. Callaghan
Attorney, Agent, or Firm—Herbert L. Lerner; Laurence A. Greenberg

[57] ABSTRACT

The multiple wall angle connection allows to connect pipes and containers with great flexibility and a good compensation of the heat expansion. To connect two pipes (1, 2), for example, three coaxial angle connections (3, 4, 5) are interconnected. The internal connection (5) is connected to the first pipe (1) and the external connection (3) to the second pipe (2). The connections are interconnected by junction pieces (7) of semi-toric shape arranged at each side, at respective ends. Straight pipe portions (9–13 and 19–23) can be provided between the connections and the junction pieces. They can be cylindrical or conic. Control apparatus can be inserted within the space comprised between the different connections.

5 Claims, 2 Drawing Figures

MULTISHELL PIPE BEND

The instant invention relates to a pipe connection of two pipelines preferably disposed at an angle to one another. In the construction of facilities, the individual parts of which are connected to one another by pipelines, there is a striving generally, for reasons of flow technology and cost, to manage with the shortest possible pipelines and, for this purpose, to construct as compactly as possible with consideration to other vital viewpoints, for example, the accessibility for monitoring and repairs. This viewpoint applies to an amplified extent in nuclear-technological facilities and therein, in turn, especially for the primary zone of a nuclear reactor, amongst others to keep costly radiation shielding to as little as possible at the periphery. These viewpoints are opposed by the necessity of caring for the reduction of the stresses which are produced by the thermal expansion of the pipelines per se and the parts of the facilities connected thereby. In nuclear-technological facilities with the temperature thereof consisting of several hundred degrees Celsius, the thermal expansions can reach such a considerable scale as to force a "yielding" suspension of the pipelines. Compensation can be effected in zones which are less vulnerable from the safety-engineering standpoint by corrugated tube compensators, the introduction of which into the primary circulation of nuclear reactors being, however, a subject of concern. The possibility is provided here only of providing the pipelines with an expansion capability in the form of loops which, however, have a large space occupancy. To increase the flexibility of such loops, it is known (German Published Prosecuted Application DE-AS No. 15 25 842) to divide the pipeline in the vicinity of the loop into several mutually parallel connecting pipes of smaller diameter which, however, raises various problems with respect to flow engineering and manufacturing technology especially for lines conducting liquid metal.

The problem of the instant invention is to provide a curved connection of two pipelines which has a high elasticity and thus permits, within a very small space, the compensation of considerable thermal expansions in pipelines. The connection should, moreover, also suffice for meeting the other requirements that are to be met by a pipeline, for example, with regard to testability, even after a given operating period. Curved connections of two pipelines disposed at an angle to one another lend themselves especially well to a use as expansion compensation members, because such bends are more flexible than straight pipe lengths.

The solution for the problem is effected by a band connection for pipelines and vessels, comprising a first and a second pipeline, a multiplicity of coaxial spaced-apart pipe bends disposed within each other, the pipe bends including at least an outer, an inner, and at least one middle pipe bend each having ends, one of the ends of the outer pipe bend being integral with the second pipeline, one of the ends of the inner pipe bend being integral with the first pipeline, and half torus-shaped connecting pieces connecting one of the ends of the at least one middle pipe bend to the next inner pipe bend and connecting the other of the ends of the at least one middle pipe bend to the next outer pipe bend. The connection of mutually coaxial pipe lengths of varying diameters at the ends thereof by means of half torus-shaped connecting members is known from German Pat. No. 22 59 584, which is concerned, at any rate, with an elastic lead-through of pipelines through the wall of a nuclear reactor containment. In the proposed curved connection, the individual pipe bends are connected, so to speak, in series, and forces or moments applied from the outside travel therethrough one after the other and stress them to an equal extent. The deformation of the entire connection results from the sum of the individual deformations for each pipe bend, as the man of skill can calculate it with the aid of the known method described, for example, in H. Hampel: "Pipeline Statics", Berlin 1972, page 128 et seq. Also proposed is that the number of the pipe bends encased within one another are three, five, seven and so forth, if two pipelines are connected to one another. On the other hand, if a pipeline is additionally connected with a vessel or container, then the number of the pipe bends encased within one another is two, four, six and so forth.

The straight pipe lengths which are furthermore to be connected between the pipe bends and the half torus-shaped connecting members, have the problem of equalizing or just permitting the varying elliptical deformation of the curved pipe cross section, because this is prevented by direct fastening of the connecting members. In a three-shell curved pipe, for example, the deformation of the middle shell with respect to the outer and inner shells is offset through 90°.

The frustroconical shape of the straight pipe lengths which is additionally proposed in has the effect that with only negligibly increased dimensions a larger path for the bending is available than with the use of cylindrical pipe lengths, with, of course, increased manufacturing expense.

Figure 2:
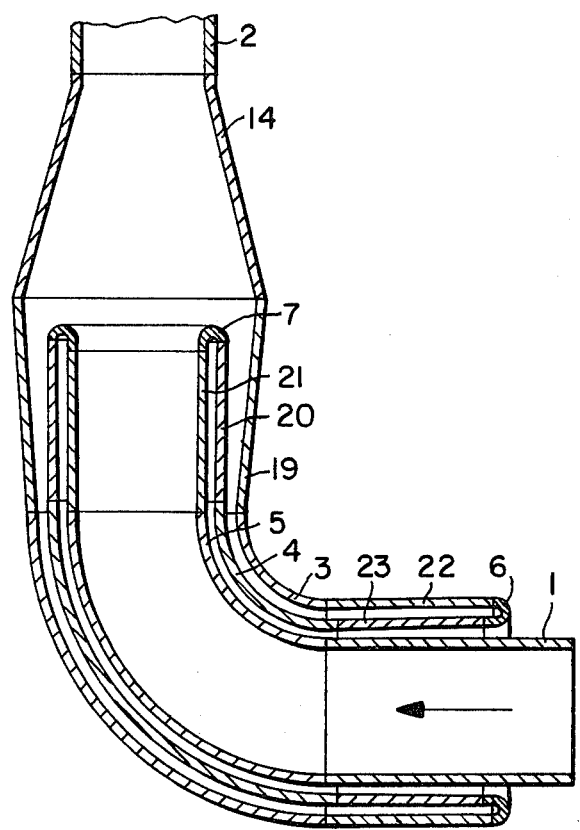

FIGS. 1 and 2 show two exemplary embodiments of the invention are represented in the drawing, and indeed both figures show a 90° bend in an axial longitudinal sectional view.

It is, of course, also possible to produce other connections, for example also those with a 180° angle. A first pipeline 1 is to be connected to a second pipeline 2 disposed at a right angle thereto, it being assumed that the flowdirection is from the first into the second pipeline. The connection in the example is formed of three pipe bends 3,4,5 disposed within and coaxial to one another, the inner pipe bend 5 being connected at the one end thereof to the first pipeline 1, and the outer pipe bend 3 at the one end thereof through a conical intermediate member 14 to the second pipeline 2. A straight cylindrical pipe length 11 is added to the free end (FIG. 1) of the inner pipe bend 5, and another straight cylindrical pipe length 12 to the free end of the outer pipe bend 3. The middle pipe bend 4 likewise has at both ends thereof straight cylindrical pipe lengths 10 and 13, respectively, of equal length with the foregoing. The straight pipe lengths 12 and 13 or 10 and 11, respectively, are connected to one another by half torus-shaped (of U-shaped cross section) connecting pieces 6 and 7, respectively. The term "torus", in this connection, is supposed to include also such annular members having a cross section deviating from a pure circular shape, for example, elliptical. The spacing between the pipe bends is of such dimension that they and the pipe lengths connected thereto, respectively, do not come into contact with one another during the anticipated bendings. This is achieved in an alternate embodiment (FIG. 2) by the frustoconical construction of several of the straight pipe lengths, identified here by 19,22,23 whereas the others, here 20,21 are cylindrical. The opening of the frustum of the cone is, in this regard, located on the side lying opposite the pipe bends 3,4,5. In a pressure transmitting pipeline, the outer pipe bend 3 and the inner pipe bend 5 are loaded from the inside, the middle pipe bend 4, however, is loaded from the outside, which must be taken into account in the dimensioning of the wall thickness thereof. The spacing between the inner pipe bend 5 and the middle pipe bend 4 and the straight pipe lengths connected thereto can be of such dimension that inspection instruments, for example for examining welding seams, can be introduced into the gap intermediate thereto. If necessary, a drain opening, not illustrated here, can be provided at suitable locations (in the connecting piece 6 here) in order to drain off liquid filling the intermediate space between the individual pipe bends. In another device, for example, turned upside down, a blow-off opening can serve for degassing the pipe connection.

It is immediately apparent that the demand for additional space for the proposed curved connection as compared to a simple pipe bend is only very small. For a pipeline of the nominal width (NW) 550 with a wall thickness of 10 mm (which is also true for the inner pipe bend 5) and a spacing of the individual pipe bends from one another of 20 mm, an increasing in bending elasticity of about 100% with respect to the simple curved connection is produced.

I claim:

1. Bend connection for pipelines and vessels, comprising a first and a second pipeline, a multiplicity of coaxial spaced-apart pipe bends disposed within each other, said pipe bends including at least an outer, an inner, and at least one middle pipe bend each having ends, one of said ends of said outer pipe bend being integral with said second pipeline, one of said ends of said inner pipe bend being integral with said first pipeline, and half torus-shaped connecting pieces connecting one of said ends of said at least one middle pipe bend to the next inner pipe bend and connecting the other of said ends of said at least one middle pipe bend to the next outer pipe bend.

2. Bend connection according to claim 1, wherein said multiplicity of pipe bends is an odd number greater than one.

3. Bend connection according to claim 2, wherein one of said pipelines is integral with a receptacle and said multiplicity of pipe bends is an even number.

4. Bend connection according to claim 2 or 3, including straight pipe lengths disposed between said multiplicity of pipe bends and said connecting pieces.

5. Bend connection according to claim 4, wherein said straight pipe lengths disposed between said connecting pieces and said next outer pipe bend are frustroconically-shaped and have the smaller diameter end thereof connected to said next outer pipe bend.

* * * * *